United States Patent
Yamada et al.

(10) Patent No.: US 8,888,369 B2
(45) Date of Patent: Nov. 18, 2014

(54) THIN STRUCTURE ROTATING DEVICE HAVING IMPROVED IMPACT RESISTANCE

(75) Inventors: Takuji Yamada, Fujieda (JP); Takanori Watanabe, Fujieda (JP); Susumu Ando, Fujieda (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 35 days.

(21) Appl. No.: 13/371,188

(22) Filed: Feb. 10, 2012

(65) Prior Publication Data

US 2012/0213459 A1 Aug. 23, 2012

(30) Foreign Application Priority Data

Feb. 22, 2011 (JP) ................. 2011-036320

(51) Int. Cl.
*F16C 32/06* (2006.01)
*F16C 33/10* (2006.01)
*F16C 17/02* (2006.01)

(52) U.S. Cl.
CPC ............. *F16C 17/026* (2013.01); *F16C 33/107* (2013.01); *F16C 32/0685* (2013.01)
USPC .......................................... 384/112; 384/113

(58) Field of Classification Search
CPC .... F16C 17/107; F16C 17/102; F16C 17/105; F16C 2370/12; F16C 32/06
USPC .......... 384/100, 101, 107, 110, 112, 119, 132
See application file for complete search history.

(56) References Cited

U.S. PATENT DOCUMENTS

| | | | | |
|---|---|---|---|---|
| 6,834,996 B2* | 12/2004 | Gomyo et al. | ................ | 384/100 |
| 7,736,061 B2* | 6/2010 | Gotoh et al. | ................ | 384/113 |
| 8,395,861 B2* | 3/2013 | Tashiro | ...................... | 360/99.08 |
| 2005/0100256 A1* | 5/2005 | Nagarathnam et al. | ....... | 384/107 |
| 2006/0244326 A1* | 11/2006 | Tamaoka | ........................ | 310/90 |
| 2007/0176503 A1* | 8/2007 | Yajima | ............................ | 310/90 |
| 2007/0188035 A1* | 8/2007 | Kim | ............................... | 310/90 |
| 2008/0290246 A1* | 11/2008 | Nishino et al. | ................ | 248/674 |
| 2011/0043948 A1* | 2/2011 | Watanabe et al. | ............. | 360/244 |

FOREIGN PATENT DOCUMENTS

JP 2010175046 A 8/2010

* cited by examiner

*Primary Examiner* — Richard W Ridley
*Assistant Examiner* — Yamilka Pinero Medina
(74) *Attorney, Agent, or Firm* — Blank Rome LLP (57) ABSTRACT

A rotating device includes: a rotating body, a fixed body and lubricant. A surrounding member in the fixed body has a sleeve and a housing for surrounding the sleeve. A first radial dynamic pressure generating groove and a second radial dynamic pressure generating groove are formed on at least one of the inner circumferential surface of the sleeve and the outer circumferential surface of a shaft in the rotating body. The sleeve has a flange portion protruding radially outward at the end portion of the sleeve near to a hub in the rotating body. A concave portion, which is made by axially concaving at least part of the area corresponding to a wall thickness of the sleeve on the inner circumference side of the flange portion, is circumferentially provided in the flange portion.

18 Claims, 4 Drawing Sheets

THIN STRUCTURE ROTATING DEVICE HAVING IMPROVED IMPACT RESISTANCE

CROSS-REFERENCES TO RELATED APPLICATIONS

This application claims priority from Japanese Application No. 2011-036320, filed Feb. 22, 2011.

BACKGROUND OF THE INVENTION

1. Field of the Invention

The present invention relates to a technique for improving the impact resistance of a rotating device, in particular, of a thin structure rotating device.

2. Description of the Related Art

Rotating devices, such as hard disk drives (hereinafter, sometimes referred to as disk drive devices, or HDDs), have been mounted in various electronic apparatuses by the size and weight thereof being reduced while the capacity thereof has been increased. In particular, rotating devices have been mounted in mobile electronic apparatuses. Although there is a demand that the rotating device to be mounted in such the mobile electronic apparatus should have improved impact resistance to withstand an impact occurring when dropped, etc., there is the possibility that the impact resistance may be decreased when the size, thickness and weight thereof are reduced, as stated above. That is, there is the trade-off demand that the rotating device to be mounted in a mobile electronic apparatus should have an improved impact resistance while it should be reduced in size and weight. The rotating devices to be required as described above include a disk drive device in which a fluid dynamic bearing unit (hereinafter, sometimes referred to as a FDB) is mounted. For example, the FDB mounted in the disk drive device disclosed in Japanese Patent Application Publication No. 2010-175046 is composed of a fixed body and a rotating body, and lubricant is interposed between the two.

In a typical disk drive device having such an FDB, the FDB is attached to a base plate. And, a hub is rotatably supported with respect to the base plate via the FDB. A magnetic recording disk is mounted on the hub. The hub is joined to the outer circumferential surface of a shaft. The FDB comprises a sleeve housed in a housing, and part of the shaft is housed in the sleeve. A radial dynamic bearing is formed between the inner circumferential surface of the sleeve and the outer circumferential surface of the shaft, so that the shaft to which the hub is joined is supported rotatably in the radial direction. A flange portion, which extends and protrudes radially outward, is formed at an end portion of the sleeve near to the hub. A thrust dynamic bearing is formed between the hub and the sleeve in the axial direction, so that the shaft to which the hub is joined is supported rotatably in the thrust direction. That is, the hub is supported rotatably with respect to the base plate via the FDB.

When the axial size of the disk drive device (rotating device) including the aforementioned FDB is to be made small, it is common that the axial dimension of the hub is also configured to be small. As a result, the axial dimension of the joint portion between the hub and the shaft becomes small. When an acceleration due to an impact is applied to the rotating device thus configured, a stress, the magnitude of which corresponds to a value obtained by multiplying the total mass of the magnetic recording disk and the hub by the acceleration due to the impact, is applied to and around the joint portion between the hub and the shaft. Accordingly, in order to maintain the impact resistance of the rotating device as before, a structure that can withstand the stress concentrated on and around the joint portion between the hub and the shaft must be adopted. That is, it has been needed to make the joint area between the hub and the shaft to be large by making the thickness of the whole hub to be large to the degree in which the hub can withstand the stress. In the current situation, however, the thickness of the hub becomes a bottleneck in making the thickness of the aforementioned rotating device to be small.

SUMMARY OF THE INVENTION

The present invention has been made in view of these situations, and a purpose of the invention is to provide a rotating device in which, even if the entirety of the rotating device is configured to be thin, a predetermined impact resistance can be maintained.

In order to solve the aforementioned problem, a rotating device according to an embodiment of the present invention comprises: a rotating body having a hub on which a recording disk is to be mounted and a shaft joined to the center hole of the hub; a fixed body having a base and a surrounding member that is fixed to the base and surrounds the shaft; and lubricant interposed between the rotating body and the fixed body. The surrounding member has both a tubular sleeve for housing the shaft and a tubular housing for surrounding and fixing the sleeve. A first radial dynamic pressure generating groove and a second radial dynamic pressure generating groove, which are used for generating radial dynamic pressure, are formed on at least one of the inner circumferential surface of the sleeve and the outer circumferential surface of the shaft, the second radial dynamic pressure generating groove being spaced apart from the first radial dynamic pressure generating groove toward a base plate. The sleeve has a flange portion protruding radially outward at the end portion of the sleeve near to the hub, and a concave portion, which is made by axially concaving at least part of the area corresponding to the wall thickness of the sleeve on the inner circumference side of the flange portion, is circumferentially provided.

In order to solve the aforementioned problem, a rotating device according to another embodiment of the invention comprises: a rotating body having a hub on which a recording disk is to be mounted and a shaft joined to the center hole of the hub; a fixed body having a base and a surrounding member that is fixed to the base and surrounds the shaft; and lubricant interposed between the rotating body and the fixed body. The surrounding member has a tubular sleeve for housing the shaft. A radial dynamic pressure generating portion for generating radial dynamic pressure is provided on at least one of the inner circumferential surface of the sleeve and the outer circumferential surface of the shaft. The sleeve has a flange portion protruding radially outward at the end portion of the sleeve near to the hub, and a concave portion, which is made by axially concaving at least part of the area corresponding to the wall thickness of the sleeve on the inner circumference side of the flange portion, is circumferentially provided.

In order to solve the aforementioned problem, a rotating device according to still another embodiment of the invention comprises: a rotating body having a hub on which a recording disk is to be mounted and a shaft joined to the center hole of the hub; a fixed body having a base and a surrounding member that is fixed to the base and surrounds the shaft; and lubricant interposed between the rotating body and the fixed body. The surrounding member has a tubular sleeve for housing the shaft. The sleeve has a flange portion protruding radially outward at the end portion of the sleeve near to the hub, and a sleeve concave portion for housing at least part of the hub, which is made by axially concaving at least part of the area corresponding to the wall thickness of the sleeve on the inner circumference side of the flange portion, is circumferentially provided. A hub concave portion for housing at least part of the flange portion is circumferentially provided on the surface of the hub near to the sleeve. The outside area of the sleeve concave portion and the inside area of the hub concave portion are overlapped with each other in the radial direction.

According to these embodiments, by forming a concave portion that is axially concaved on the inner circumference side of the flange portion, part of the hub can be entered into a portion corresponding to the concave portion. That is, the thickness of the hub can be made large in the depth direction of the concave portion, i.e., in the axial direction, within a range in which the bottom of the concave portion and the hub are not brought into contact with each other. As a result, the joint distance between the hub and the shaft can be made large by the same distance as the distance by which the axial thickness of the hub has been made large, thereby allowing the joint strength to be enhanced. Also, by entering part of the hub into the concave portion, the area of the hub, in which the radial thickness of the hub is large, is increased in the joint portion between the hub and the shaft. For example, by extending the radial width of the concave portion to the full width of the area corresponding to the wall thickness of the sleeve, the axial thickness of the hub can be made large to a radial position corresponding to the wall thickness of the sleeve. As a result, the stiffness around the joint portion between the hub and the shaft can be increased with the increase in the thickness of the hub, thereby allowing the impact resistance to be improved.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Hereinafter, the present invention will be described with reference to the drawings based on the preferred embodiments of the invention. The same or equivalent constituting elements and members illustrated in each drawing shall be denoted by the same reference numerals, and duplicative explanations will be omitted. Dimensions of members illustrated in each drawing are appropriately enlarged or reduced for easier understanding. Part of members not important for describing the embodiment are omitted from each drawing.

Figure 1:
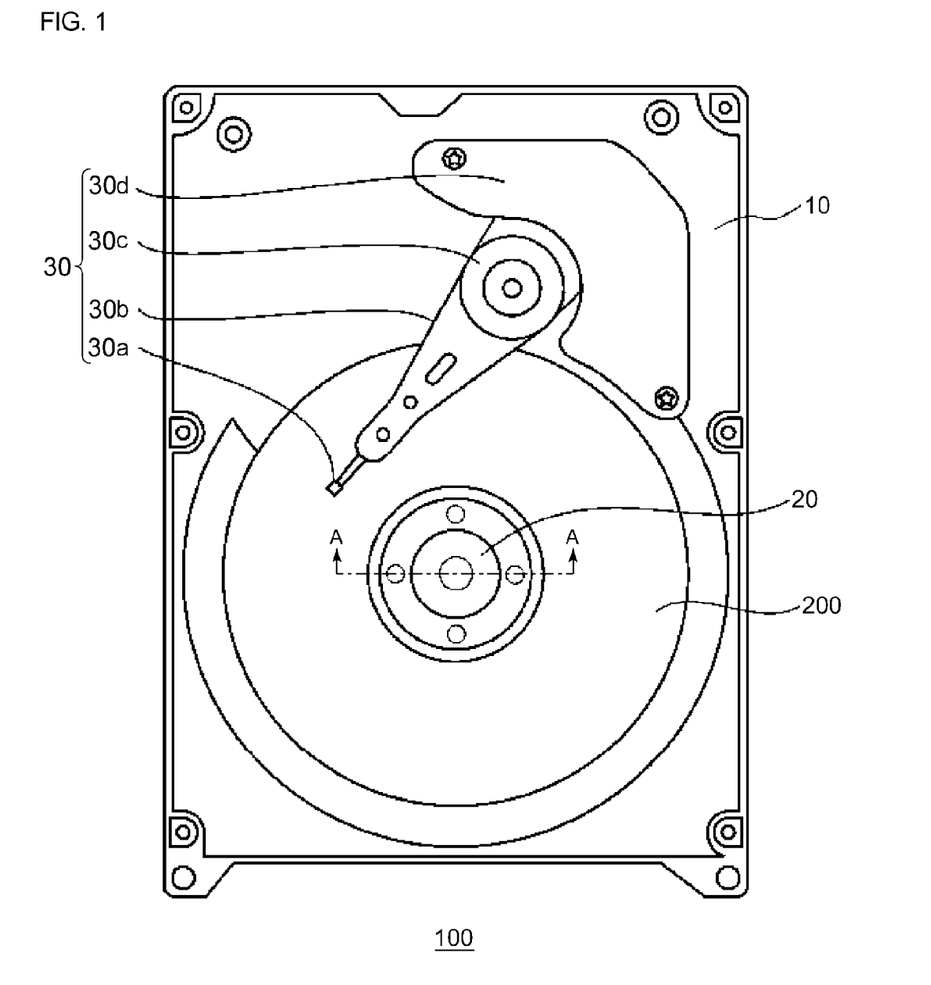
FIG. 1 is a view for explaining the internal structure of a disk drive device (HDD), which is an example of a rotating device according to the present embodiment.

FIG. 1 is a view for explaining the internal structure of a disk drive device 100, which is an example of a rotating device according to the present embodiment. In order to expose the internal structure, FIG. 1 illustrates the state of a top cover being removed.

A base plate (also, referred to as a base) 10 rotatably supports a hub 20 via a later-described bearing unit. A recording disk 200 is mounted on the hub 20 to be rotated with the rotational drive of the hub 20. A read/write unit 30 includes a recording/reproducing head 30a, a swing arm 30b, a pivot assembly 30c, and a voice coil motor 30d. The recording/reproducing head 30a is fixed to the tip of the swing arm 30b to magnetically record data on the recording disk 200 and to read data therefrom. The pivot assembly 30c supports the swing arm 30b in a swing-free manner around the head rotational axis relative to the base plate 10. The voice coil motor 30d makes the swing arm 30b swing around the head rotational axis such that the recording/reproducing head 30a is transferred to a desired position on the recording surface of the recording disk 200. The read/write unit 30 is structured with a known technique for controlling the position of a head.

Figure 2:
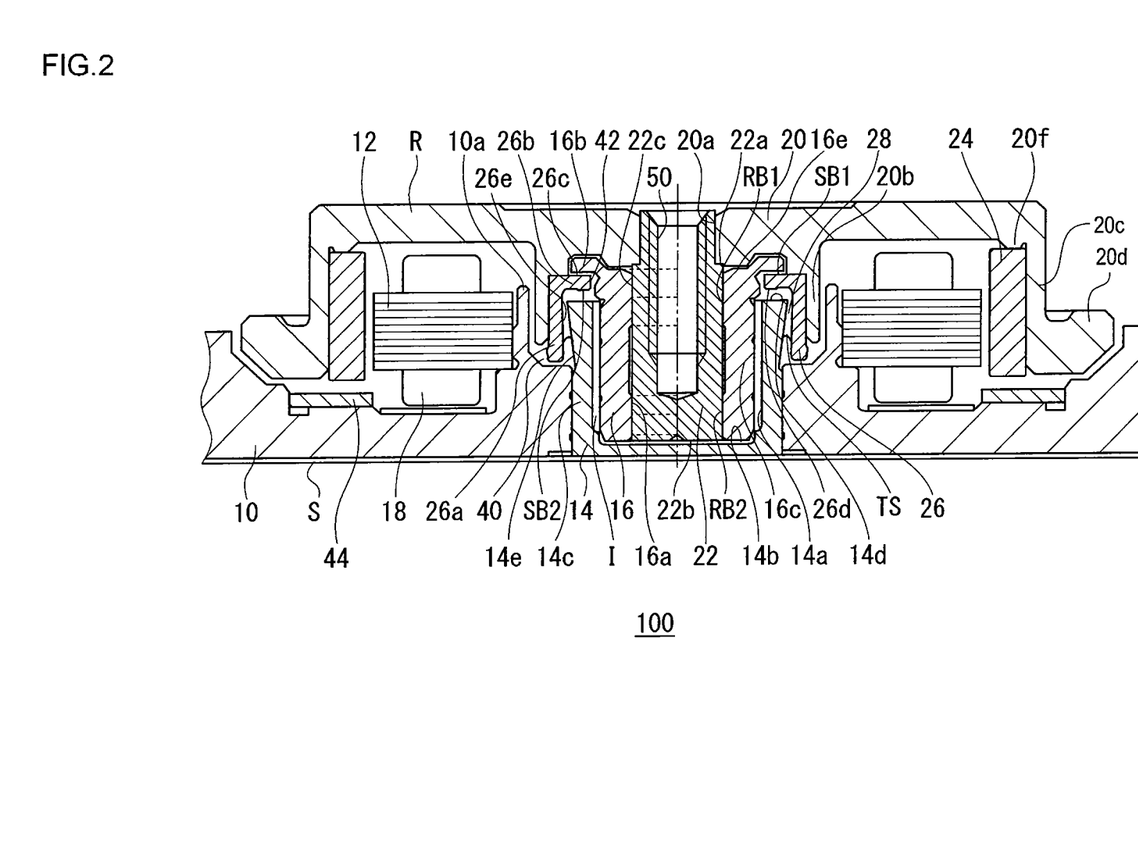
FIG. 2 is a view for explaining a portion where a recording disk in the HDD in FIG. 1 is rotationally driven.

FIG. 2 is a schematic sectional view of a brushless motor in the disk drive device 100 according to the present embodiment, which illustrates the section along the axial direction of a shaft 22 in the disk drive device 100. The disk drive device 100 includes a fixed body S and a rotating body R. The fixed body S includes the base plate 10, a stator core 12, a housing 14, and a sleeve 16. The rotating body R includes the hub 20, the shaft 22, and a thrust member 26. The base plate 10 includes a cylinder portion 10a, and the housing 14 includes a groove 14a, a bottom 14b, a cylinder portion 14c, and a housing flat portion 14d. The sleeve 16 includes a cylinder portion inner circumferential surface 16a, a flange portion 16b, and a cylinder portion 16c, and a coil 18 is wound around the stator core 12. The hub 20 includes a center hole 20a, a first cylinder portion 20b, a second cylinder portion 20c, a hub outward extension portion 20d, and a pedestal portion 20f. The shaft 22 includes a shaft step portion 22a, a tip portion 22b, and an outer circumferential surface 22c. The thrust member 26 includes a hanging portion 26a and a disk member (also referred to as a disk portion) 26b. In the present embodiment, the first cylinder portion 20b and the thrust member 26 (hanging portion 26a) are collectively referred to as a cylindrical hanging member in some cases. Also, the housing 14 and the sleeve 16 are collectively referred to as a surrounding member in some cases. In the following description, the downward direction and upward direction illustrated in the views are respectively represented, as a whole, by lower side and upper side, for convenience.

The base plate 10 has a center hole and the cylinder portion 10a provided so as to surround the center hole. The base plate 10 holds the housing 14 by the center hole and firmly fixes the stator core 12 to the outer circumference side of the cylinder portion 10a that surrounds the housing 14. An annular first area portion 40 is formed between the outer circumference side of the housing 14 and the inner circumference side of the cylinder portion 10a. The first area portion 40 has a shape to surround the center hole of the base plate 10. The base plate 10 is formed by subjecting an aluminum die-cast product to a cutting process, or by subjecting an aluminum plate or steel plate on which nickel plating has been performed to a press process.

The stator core 12 is formed by laminating magnetic materials, such as silicon steel plates, and then by subjecting the surfaces of them to insulating coating, such as electro-deposition coating, powder coating, or the like. The stator core 12 has a ring shape in which a plurality of salient poles (not illustrated) each protruding outward are included, and the coil 18 is wound around the each salient pole. The number of the salient poles is made to be, for example, nine, when the disk drive device 100 is three-phase driven. The wiring terminal of the coil 18 is soldered onto an FPC (Flexible Printed Circuit) arranged on the bottom surface of the base plate 10. The guided wiring terminal is fixed with adhesive so as not to unlay. This fixation is performed to prevent disconnection of the wire due to a vibration of large amplitude created by a resonance of the wiring end during ultrasonic wave cleaning, etc. When a three-phase current having an approximate sine wave shape is applied to the coil 18 through the FPC by a predetermined drive circuit, the coil 18 generates a rotating magnetic field in the salient poles of the stator core 12. A rotating drive force is then generated by the interaction between the driving magnetic poles of the magnet 24 and the rotating magnetic field, which rotates the rotating body R.

An attracting plate 44 is fixed to a position on the base plate 10 facing the axially lower end surface of the ring-shaped magnet 24 via a gap. The attracting plate 44 is a ring-shaped member and is formed by pressing a soft magnetic material, for example, a cold-rolled steel plate. Axial magnetic attracting force is generated between the attracting plate 44 and the magnet 24. That is, the attracting plate 44 generates hub-attracting force in the direction in which the rotating body R is attracted toward the base plate 10. The rotating body R is made to be rotated in a non-contact state with surrounding members, with the floating force that is generated by a bearing structure including later-described radial dynamic pressure generating portion RB and thrust dynamic pressure generating portion SB, the hub-attracting force, and the gravity applied to the whole rotating body R being balanced during the rotation of the rotating body R.

The housing 14 is firmly fixed to the inner circumferential surface of the cylinder portion 10a by adhesion or press-fitting. The housing 14 has an approximately cup-like shape in which the cylinder portion 14c surrounding the sleeve 16, the housing flat portion 14d that is provided at the end portion near to the hub 20 and that has the surface facing in the axial direction, and the bottom 14b by which the end portion of the cylinder portion 14c opposite to the housing flat portion 14d is sealed, are joined together. The housing 14 having such a shape is arranged so as to close the lower end of the sleeve 16 and make the upper end thereof protrude. In addition, the bottom 14b and the cylinder portion 14c may be formed integrally with each other, or both may be firmly fixed together after being formed of different members. The housing 14 may be formed by subjecting a metal material, such as SUS 303, to a cutting process. Alternatively, the housing 14 may be formed by subjecting a metal material, such as SUS 303, to a press process. Forming it by a press process is advantageous in terms of easy work. When formed by, in particular, a press process, the housing 14 may be formed such that the axial surface roughness of the cylinder portion 14c in the housing 14 is smaller than the circumferential surface roughness by polishing the inner circumferential surface of the cylinder portion 14c. By adjusting the surface roughness in such a way, the sleeve 16 can be smoothly inserted into the housing 14, and hence it is advantageous in terms of improving the assembly efficiency and suppressing the deformation of the sleeve 16 during the assembly. Also, when formed by a press process, the axial thickness of the bottom 14b in the housing 14 may be set to be larger than the radial thickness of the cylinder portion 14c. This is preferable in terms of suppressing the deformation of the housing 14 even when the exposed bottom 14b is brought into contact with a manufacturing apparatus or jig during the manufacture of the disk drive device 100. In addition, when formed by a press process, the housing 14 may be formed such that the hardness of the cylinder portion 14c is higher than that of the bottom 14b. This is preferable in terms of suppressing a decrease in the stiffness even when the wall thickness of the cylinder portion 14c is made smaller than that of the bottom 14b, thereby allowing a reduction in the size or weight of a part to be achieved and the deformation of the housing 14 during the installation of the housing 14 onto the base plate 10 to be suppressed.

In addition, the housing 14 may be formed of a copper-based alloy, a sintered alloy by powder metallurgy, or the like. Alternatively, the housing 14 may be formed of a plastic material, such as polyetherimide, polyimide, polyamide, or the like. When the housing 14 is formed of a plastic material, it is desirable that the plastic material contains, for example, carbon fiber, etc., so that the specific resistance of the housing 14 is smaller than or equal to $10^6$ Ω·m in order to secure the static eliminating performance of the disk drive device 100.

A groove 14a extending in the axial direction is formed on the inner circumferential surface of the housing 14. This groove 14a serves as a communication hole for communicating both end surface sides of the sleeve 16 when the sleeve 16 is fit into the cylinder portion 14c. This communication hole serves as a communication channel I by being filled with lubricant 28. This communication channel I will be described later. The cross-sectional shape of the groove 14a may be a concaved arc shape or concaved rectangular shape.

The sleeve 16 is firmly fixed to the inner circumferential surface of the housing 14 by adhesion or press-fitting and is fixed concentrically with the center hole of the base plate 10. The sleeve 16 has a shape in which the annular cylinder portion 16c that supports the shaft 22 by housing it and the flange portion 16b that is extended radially outward at the end portion of the cylinder portion 16c near to the hub 20 are joined together.

The cylinder portion inner circumferential surface 16a is formed in the cylinder portion 16c to surround the shaft 22. A radial space portion is formed between the cylinder portion inner circumferential surface 16a of the sleeve 16 and the outer circumferential surface 22c of the shaft 22. The first radial dynamic pressure generating portion RB1 and the second radial dynamic pressure generating portion RB2 are arranged in the radial space portion as individual radial dynamic pressure generating portions for generating radial dynamic pressure. The first and second radial dynamic pressure generating portions RB1 and RB2 will be described in detail later. The flange portion 16b and the cylinder portion 16c may be formed integrally with each other, alternatively they may be formed of different members to be firmly fixed to each other. An annular second area portion 42 is formed between the flange portion 16b and the housing flat portion 14d. The sleeve 16 can be formed by subjecting, for example, a copper alloy material to a cutting process and then by performing nickel plating. Alternatively, the sleeve 16 can be formed by sintering powders containing iron with a powder metallurgy process and then by performing a steam process to provide a triiron tetroxide layer on the surface. These cases are advantageous in terms of easy work. Alternatively, the sleeve 16 may be formed of a stainless steel plate, or the like. Alternatively, the sleeve 16 may be formed of a plastic material, such as polyetherimide, polyimide, polyamide, or the like. When the sleeve 16 is formed of a plastic material, it is desirable that the plastic material contains, for example, carbon fiber, etc., so that the specific resistance of the sleeve 16 is smaller than or equal to $10^6$ Ω·m in order to secure the static eliminating performance of the disk drive device 100.

The hub 20 is configured to include the center hole 20a provided at the center, the first cylinder portion 20b provided so as to surround the center hole 20a, the second cylinder portion 20c arranged outside the first cylinder portion 20b, and the hub outward extension portion 20d extended in the radial direction of the hub 20 at the lower end of the second cylinder portion 20c. The hub 20 has an approximately cup-like shape and a soft magnetic property. For example, the hub 20 can be formed by using a steel material, such as SUS 430F. The hub 20 is formed into a predetermined shape of an approximately cup-like shape by subjecting a steel plate to a press process, cutting process, or the like.

The thrust member 26 is firmly fixed to the inner circumferential surface of the first cylinder portion 20b of the hub 20, while the magnet 24 is firmly fixed to the inner circumferential surface of the second cylinder portion 20c. The magnet 24 is firmly fixed to an annular portion concentric with the shaft 22 so as to face the stator core 12 firmly fixed to the base plate 10. With such a structure, the hub 20 is rotated integrally with the shaft 22 to rotate the non-illustrated recoding disk 200. The recording disk 200 is mounted on the hub outward extension portion 20d by the center hole being engaged with the outer circumferential surface of the second cylinder portion 20c.

The shaft 22 is joined to the center hole 20a of the hub 20 by, for example, interference fit. On the other hand, the side of the tip portion 22b of the shaft 22 is housed in the cylinder portion 16c of the sleeve 16. The shaft 22 can be formed of, for example, a stainless steel material.

The thrust member 26 has the disk member 26b that surrounds the sleeve 16 and the hanging portion 26a that surrounds the housing 14. Herein, the disk member 26b is firmly fixed to the internal wall of the first cylinder portion 20b with an adhesive, and the hanging portion 26a is joined to the outer edge of the disk member 26b and firmly fixed to the internal wall of the first cylinder portion 20b by adhesion. That is, the outer circumference surface of the hanging portion 26a is firmly fixed to the inner circumferential surface of the first cylinder portion 20b by adhesion. Thus, the disk member 26b surrounds the outer circumference of the cylinder portion 16c via a gap and is arranged on the lower surface of the flange portion 16b via a narrow gap. Although the thrust member 26 is rotated integrally with the hub 20, at the time, the disk member 26b is rotated in the second area portion 42 while the hanging portion 26a is rotated in the first area portion 40.

As illustrated in FIG. 2, the disk member 26b has a shape that includes a thrust upper surface 26c and a thrust lower surface 26d and that is thin in the axial direction. The hanging portion 26a axially extends on the lower surface of the disk member 26b near to the outer circumference thereof. The first thrust dynamic pressure generating portion SB1 is formed by the thrust upper surface 26c of the disk member 26b and the lower surface of the flange portion 16b. In this case, a thrust dynamic pressure generating groove is formed, by a known process, on at least one of the surface of the disk member 26b and that of the flange portion 16b, which face each other in the axial direction. Also, the second thrust dynamic pressure generating portion SB2 is formed by the thrust lower surface 26d of the disk member 26b and the housing flat portion 14d, which is the upper end portion of the housing 14. In this case, a thrust dynamic pressure generating groove is formed, by a known process, on at least one of the surface of the disk member 26b and that of the housing 14, which face each other in the axial direction. One of the first thrust dynamic pressure generating portion SB1 and the second thrust dynamic pressure generating portion SB2 may be formed, alternatively both of the two may be formed. By forming the first thrust dynamic pressure generating portion SB1 or the second thrust dynamic pressure generating portion SB2 in such a way, the wear of the surfaces that face each other in the thrust direction can be reduced. Alternatively, a thrust dynamic pressure generating groove may be formed on at least one of the surface of the hub 20 and a flange surface 16d, which face each other in the axial direction. In this case, the wear of the hub 20 and the flange surface 16d, occurring in the thrust direction, can be reduced and thrust dynamic pressure by which the rotating body R is supported in an axially non-contact state with the fixed body S is generated in the same way as when the first thrust dynamic pressure generating portion SB1 and the second thrust dynamic pressure generating portion SB2 are formed. In the present embodiment, the thrust member 26 has a cross section having an "L"-like shape, as illustrated in FIG. 2, by joining the disk member 26b and the hanging portion 26a together. The inner circumferential surface 26e of the hanging portion 26a has a tapered shape in which the radius thereof becomes smaller toward the side opposite to the side where the disk member 26b is formed, thereby allowing the later-described capillary seal portion TS to be formed. Such the thrust member 26 can be formed easily and inexpensively by subjecting, for example, a plate-shaped metal material to a press process, etc. By using a press process, etc., the thrust member 26 with good dimensional accuracy can be formed even when the member 26 becomes small and thin in size. As a result, the thrust member 26 can contributes to reduction in the size and weight of the disk drive device 100.

The thrust member 26 has the function of preventing the rotating body R from coming off the fixed body S, other than forming the thrust dynamic pressure generating portion. When the rotating body R and the fixed body S move, due to an impact, in the direction where they are relatively away from each other, the disk member 26b is brought into contact with the lower surface of the flange portion 16b. As a result, the function of preventing coming off is achieved.

Subsequently, the dynamic bearing in the structure of the disk drive device 100 will be described. The radial dynamic bearing includes the radial dynamic pressure generating portion that is configured to include the outer circumferential surface 22c of the shaft 22, the cylinder portion inner circumferential surface 16a of the sleeve 16, and the lubricant 28 injected into the gap between the two, such as oil. The radial dynamic pressure generating portion is composed of a plurality of individual radial dynamic pressure generating portions. In the present embodiment, as the individual radial dynamic pressure generating portions that are spaced apart from each other in the axial direction, the first radial dynamic pressure generating portion RB1 is arranged near to the hub 20, while the second radial dynamic pressure generating portion RB2 is arranged away from the hub 20. The first radial dynamic pressure generating portion RB1 and the second radial dynamic pressure generating portion RB2 are provided in the gap between the cylinder portion inner circumferential surface 16a and the outer circumferential surface 22c to support the rotating body R by generating radial dynamic pressure. Each of the first radial dynamic pressure generating portion RB1 and the second radial dynamic pressure generating portion RB2 has a first radial dynamic pressure generating groove and a second radial dynamic pressure generating groove, which are used for generating dynamic pressure on at least one of the outer circumferential surface 22c and the cylinder portion inner circumferential surface 16a, which face each other. The first and second radial dynamic pressure generating grooves can be formed to have, for example, a herring-born shape. A lubricant reservoir P is provided between the first radial dynamic pressure generating portion RB1 and the second radial dynamic pressure generating portion RB2. That is, a hub joint portion to which the hub 20 is joined, the first radial dynamic pressure generating groove, the lubricant reservoir P, and the second radial dynamic pressure generating groove, are formed, sequentially in the axial direction, on the outer circumferential surface of the shaft 22. These axial dimensions are in a relationship in which, when one dimension is made large, another dimension becomes small.

When the rotating body R is rotated, the radial dynamic pressure generating grooves generate radial dynamic pressure, thereby allowing the shaft 22 to be supported, by the radial dynamic pressure, via a radial predetermined gap from the sleeve 16. The axial width of an area where the first radial dynamic pressure generating groove is formed in the first radial dynamic pressure generating portion RB1 is made to be larger than that of an area where the second radial dynamic pressure generating grove is formed in the second radial dynamic pressure generating portion RB2. Thereby, radial dynamic pressures, which respectively correspond to the lateral pressures whose magnitudes are different from each other in the axial direction of the shaft 22, are generated in the first and second radial dynamic pressure generating portions RB1 and RB2. By generating large radial dynamic pressure in the first radial dynamic pressure generating portion RB1 in such a way, the support of the shaft 22 near to a heavy member, such as the hub 20, is stably performed. On the other hand, by generating, in the second radial dynamic pressure generating portion RB2, radial dynamic pressure smaller than that in the first radial dynamic pressure generating portion RB1, the shaft 22 is secondarily supported. Smooth rotation of the shaft 22 can be achieved and high shaft stiffness can be obtained with this structure. Generation of radial dynamic pressure means, in other words, generation of rotational resistance, which causes a shaft loss when the shaft 22 is driven. However, by making the radial dynamic pressure generated in the second radial dynamic pressure generating portion RB2 to be small, as stated above, the shaft 22 is supported stably in the axial direction while a shaft loss is being reduced. Accordingly, optimum balance between the high shaft stiffness and the low shaft loss can be obtained by adjusting the radial dynamic pressures generated in the first and second radial dynamic pressure generating portions RB1 and RB2.

On the other hand, the thrust dynamic bearing includes the first thrust dynamic pressure generating portion SB1 and the second thrust dynamic pressure generating portion SB2, as illustrated in FIG. 2. The first thrust dynamic pressure generating portion SB1 is formed by the thrust upper surface 26c of the disk member 26b, the lower surface of the flange portion 16b, and the lubricant 28 injected into the axial gap between the two. The second thrust dynamic pressure generating portion SB2 is formed by the thrust lower surface 26d of the disk member 26b, the housing flat portion 14d, and the lubricant 28 injected into the axial gap between the two.

In each of the first and second thrust dynamic pressure generating portions SB1 and SB2, a thrust dynamic pressure generating groove (not illustrated) for generating dynamic pressure is formed on at least one of the surfaces of the axial gap. This thrust dynamic pressure generating groove can be formed to have, for example, a spiral shape or a herring-born shape similar to that of the radial dynamic pressure generating groove. With the rotation of the rotating body R, the thrust dynamic pressure generating portion SB generates dynamic pressure in the pump-in direction in which the lubricant 28 is fed, as a whole, from the capillary seal portion TS to the inside of the bearing; and this pressure makes axial force, i.e., floating force act on the rotating body R. As a result, the rotating body R is elevated from the fixed body S to be supported in a non-contact state. The lubricant 28 injected into the gap in each of the first radial dynamic pressure generating portion RB1, the second radial dynamic pressure generating portion RB2, the first thrust dynamic pressure generating portion SB1, and the second thrust dynamic pressure generating portion SB2, is commonly used and is prevented from leaking out by being sealed with the capillary seal portion TS.

Further detailed structures will be described with reference to FIG. 3, centered on the joint portion between the hub 20 and the shaft 22. As stated above, the sleeve 16 has the flange portion 16b provided so as to protrude radially outward at the end portion of the sleeve 16 near to the hub 20. The flange surface 16d, which is a surface axially facing the hub 20, is formed at the end portion of the flange portion 16b near to the hub 20. It is desirable that the inner circumferential diameter d1 of the flange surface 16d is formed to be larger than the diameter d2 of the area in the side surface of the sleeve 16, the area being in contact with the inner circumferential surface of the housing 14. That is, in the flange portion 16b, the flange surface 16d, which is a surface axially facing the hub 20, is formed radially outside the inner circumferential surface of the housing 14. In other words, the sleeve 16 has the flange portion 16b protruding radially outward at the end portion of the sleeve 16 near to the hub 20, and a concave portion 16e (sometimes referred to as a sleeve concave portion), which is made by axially concaving at least part of the area corresponding to the wall thickness of the sleeve 16 on the inner circumference side of the flange portion 16b, is circumferentially provided.

As a result, it becomes possible to axially extend part of the area that forms the center hole 20a of the hub 20 toward the concave portion 16e of the sleeve 16, thereby allowing the joint dimension L1 of the joint portion between the hub 20 and the shaft 22 to be secured or increased. Also, by forming the inner circumferential diameter d1 of the flange surface 16d to be larger than the diameter d2 of the area that is in contact with the inner circumferential surface of the housing 14, an area of the hub 20 whose wall thickness is large, the area being located radially outside the hub 20, can be expanded while the joint dimension L1 of the joint portion between the hub 20 and the shaft 22 is being secured or increased. That is, it becomes possible to expand the area whose axial thickness is large from the center hole 20a of the hub 20 even to the radial outside of the hub 20, thereby allowing the stiffness around the center hole 20a to be improved. By forming the concave portion 16e in such an area, the large axial dimension L1 of the joint portion between the center hole 20a of the hub 20 and the shaft 22 can be secured and the stiffness of the hub 20 around the joint portion can be secured or improved.

Figure 4:
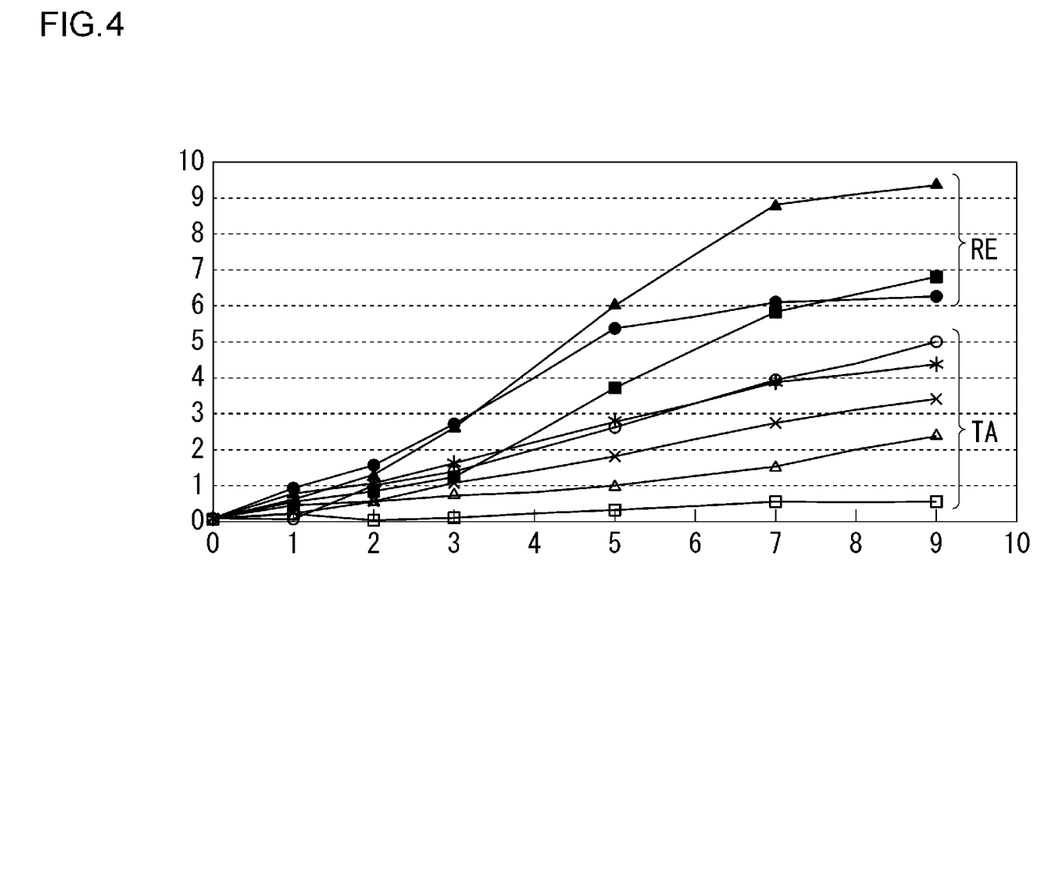
FIG. 4 is a graph in which, when a bending moment due to an axial unbalanced load is applied to the disk mounting portion of the HDD, the axial bias of the hub in the structure according to the present application is compared with that in a conventional structure.

FIG. 4 is a graph in which, when a bending moment due to an unbalanced load is applied to the radial end portion of a hub, the axial bias in the rotating device comprising the sleeve 16 of the present embodiment in which the concave portion 16e has been formed, is compared with that in the rotating device comprising a sleeve of a comparative example in which the concave portion 16e has not been formed. The bias represents an axial displacement of the radial end portion of the hub, i.e., of the end portion of the hub outward extension portion 20d, which is the disc mounting portion. In FIG. 4, the horizontal axis represents the magnitude of a bending moment, which is 1.1 (N·m) when the number is 10. The vertical axis represents an axial bias in μm. The diameter of the hole in the joint portion of the comparative example is 2.1 mm, and the thickness is 1.147 mm within a range in which the diameter around the hole is 2.8 mm. The thickness becomes gradually smaller from the area where the diameter around the hole is 2.8 mm to the area where the diameter is 3.4 mm; and the thickness reaches 0.697 mm at the area where the diameter is 3.4 mm. On the other hand, the diameter of the hole in the joint portion of the hub 20 according to the present embodiment is 2.1 mm, and the thickness is 1.147 mm within a range in which the diameter around the hole is 3.7 mm, because the thickness can be made large due to the presence of the concave portion 16e. The thickness becomes gradually smaller from the area where the diameter is 3.7 mm to the area where the diameter is 4.3 mm; and the thickness reaches 0.697 mm at the area where the diameter is 4.3 mm. In the three rotating devices RE of the comparative example, an average bias of 7.5 μm was generated when a bending moment of 1 (N·m) was applied. On the other hand, in five rotating devices TA according to the present embodiment, an experiment result has been obtained in which the bias can be suppressed to average 3.2 μm when the same bending moment of 1 (N·m) is applied. That is, a result has been obtained in which the impact resistance in the joint portion between the hub 20 and the shaft 22 can be improved by forming the concave portion 16e according to the embodiment. In this case, it is not needed to make the whole axial thickness of the hub 20 to be large, which can contribute to a reduction in the thickness of the whole rotating device.

If the thickness of the flange portion 16b is made small to avoid the interference with the hub 20, occurring when the inner circumferential diameter d1 of the flange portion 16b is formed to be larger than the diameter d2 of the inner circumferential surface of the housing 14, the flange portion 16b is likely to deform due to a contact with a jig or an apparatus during the assembly thereof. If the flange portion 16b deforms, the gap with another member is decreased, thereby causing normal rotation to be hampered. Accordingly, in the present embodiment, a circumferential hub concave portion 20g, which is used for housing at least part of the flange portion 16b, is formed on the surface of the hub 20 near to the base plate 10, as illustrated in FIG. 3. By forming the hub concave portion 20g in such a way, the flange portion 16b can be housed in the hub concave portion 20g, thereby allowing the thickness of the flange portion 16b to be made large by just that much. As a result, a sleeve structure resistant to deformation can be obtained. In the embodiment, it is made that the outside area of the concave portion 16e of the sleeve 16 (sleeve concave portion) and the inside area of the hub concave portion 20g are overlapped with each other in the radial direction, as illustrated in FIG. 3. By overlapping each other in such a way, it becomes possible that the concavo-convex shape of the hub 20 and that of the sleeve 16 face each other in a non-contact state with each other. As a result, the disk drive device 100 that is resistant to deformation and is able to be rotated smoothly can be obtained.

Figure 3:
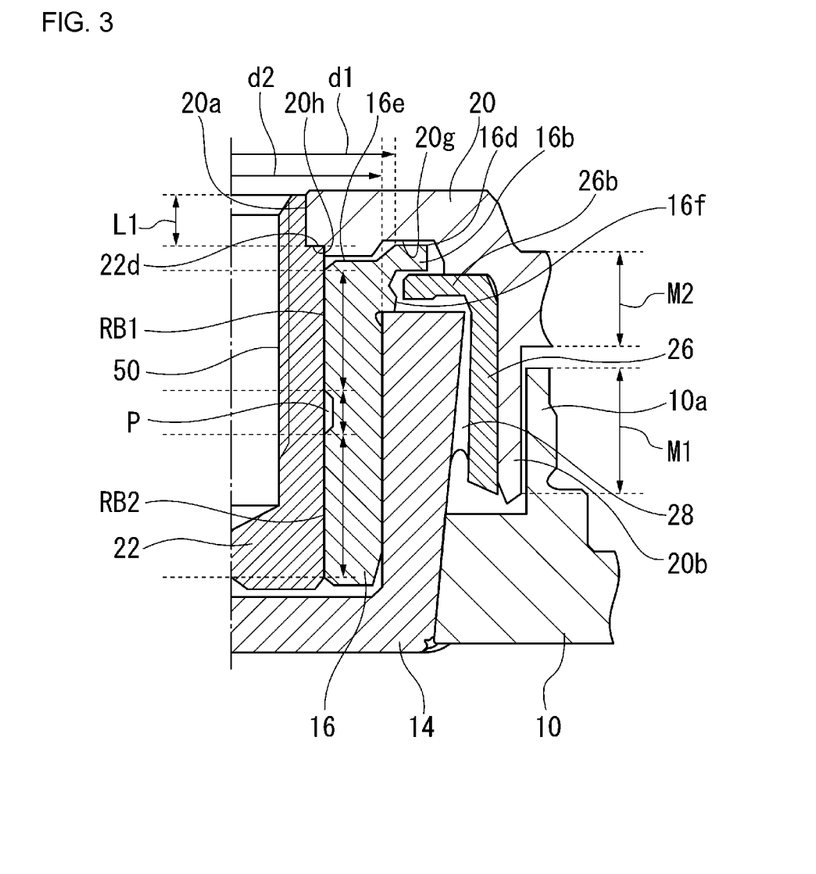
FIG. 3 is a view for explaining an example of the shapes of a hub and a sleeve in the HDD according to the embodiment.

As illustrated in FIG. 3, the shaft 22 according to the present embodiment is constructed to have a shaft step portion 22d on which the lower surface of the hub 20 near to the base plate 10 is seated as the shaft 22 is inserted into the center hole 20a of the hub 20. If the shaft step portion 22d is not formed, a large force including an axial force is applied to the hub 20 when the recording disk 200 mounted on the hub 20 receives an impact acceleration, and hence there is the fear that the joint position between the hub 20 and the shaft 22 may be shifted. In addition, if the axial dimension of the hub joint portion is small, there is also the fear that the hub 20 may be inclined with respect to the shaft 22 when the recording disk 200 receives an impact acceleration. If the joint portion of the hub 20 is shifted toward the base plate 10 or the hub 20 is inclined, as stated above, the gap between the hub 20 and the flange portion 16b is decreased, thereby possibly causing normal rotation to be hampered. In the embodiment, the shaft step portion 22d is formed at a position closer to the base plate 10 than to the flange surface 16d in the axial direction. There is the effect that the joint position between the hub 20 and the shaft 22 is resistant to shift due to the presence of the shaft step portion 22d. It is preferable to form the shaft step portion 22d at a position closer to the base plate 10 than to the upper surface of the flange portion 16b in the axial direction. By forming the shaft step portion 22d at a position close to the base plate 10, it becomes possible to make the axial dimension of the hub joint portion to be large, which is advantageous in terms of increasing the joint force and suppressing the inclination of the hub 20.

In the embodiment of FIG. 3, an annular joint concave portion 20h is provided at the edge of the center hole 20a of the hub 20 to be engaged with the shaft step portion 22d. A labyrinth structure is formed by the joint of this concave portion, in which leak of the lubricant 28 interposed between the end portion of the sleeve 16 and the hub 20, occurring from the joint portion between the hub 20 and the shaft 22 to the outside, is suppressed.

If the difference between the diameters of a small-diameter portion and a large-diameter portion in the shaft step portion 22d is small, the area of the portion (so-called seat) where the hub 20 is in contact with the shaft step portion 22d in the axial direction becomes small. If the seat is small, there is the fear that the shaft 22 may cause buckling when receiving an impact in which the shaft 22 breaks into the center hole 20a. On the other hand, if the difference between these diameters is made too large, the diameter of the shaft 22 in the hub joint portion becomes small, and hence deformation of the shaft 22 is likely to be caused when receiving an impact, thereby possibly causing the hub 20 to be inclined. The present inventors have confirmed from experiments that, in the disk drive device 100 according to the present embodiment, the difference between the diameters of the small-diameter portion and the large-diameter portion in the shaft step portion 22d is preferably within a range of 0.4 mm to 0.9 mm. In this case, it has been confirmed that the buckling or deformation, which becomes a problem in practical use, is not caused even when the impact supposed during the use of the disk drive device 100 is applied thereto. In the embodiment, the difference between the diameters of the small-diameter portion and the large-diameter portion in the shaft step portion 22d is formed, as an example, to be 0.7 mm.

In the present embodiment, in order to accurately maintain the joint position between the housing 14 and the sleeve 16, the sleeve 16 is constructed to have a sleeve protruding portion 16f that protrudes radially outward to be engaged with the housing flat portion 14d, which is the upper surface of the housing 14 near to the hub 20, as the sleeve 16 is inserted into the tubular surrounding portion formed in the housing 14. This sleeve protruding portion 16f is formed at a position closer to the end of the first radial dynamic pressure generating groove near to the hub 20 than to the end thereof near to the base plate 10 in the axial direction. If such the sleeve protruding portion 16f is not provided, there is the fear that the joint position between the housing 14 and the sleeve 16 may be shifted when a rotating device receives an impact acceleration. In the embodiment, there is the effect that the joint position between the sleeve 16 and the housing 14 is resistant to shift by forming the sleeve protruding portion 16f. Also, by forming the sleeve protruding portion 16f at a position close to the hub 20, the axial dimension of the joint portion between the housing 14 and the sleeve 16 can be secured so as to be large, thereby allowing the joint force to be maintained or improved.

The capillary seal portion TS is composed of the outer circumferential surface 14e of the housing 14 and the inner circumferential surface 26e of the thrust member 26. The outer circumferential surface 14e has an inclined surface in which the diameter thereof is reduced going from the upper surface side toward the lower surface side. On the other hand, the inner circumferential surface 26e facing the outer circumferential surface 14e also has an inclined surface in which the diameter thereof is reduced going from the upper surface side toward the lower surface side. With such a structure, the outer circumferential surface 14e and the inner circumferential surface 26e form the capillary seal portion TS in which the gap between the two expands going from the upper surface side toward the lower surface side. Herein, an injection amount of the lubricant 28 is set such that the boundary surface (gas-liquid interface) between the lubricant 28 and ambient air is located in the middle of the capillary seal portion TS, and hence the lubricant 28 is sealed by the capillary seal portion TS with capillarity. As a result, leak of the lubricant 28 is prevented. That is, the lubricant 28 is to be injected into a lubricant holding portion including: the spaces respectively forming the first radial dynamic pressure generating portion RB1, the second radial dynamic pressure generating portion RB2, the first thrust dynamic pressure generating portion SB1, and the second thrust dynamic pressure generating portion SB2; the space between the housing 14 and the thrust member 26; and the space between the flange portion 16b and the hub 20, etc.

In the example illustrated in FIGS. 2 and 3, an example in which the capillary seal portion TS is composed of the thrust member 26, which is a different member fixed to the first cylinder portion 20b, has been described. In another example, the capillary seal portion TS may be composed of a cylindrical hanging member, which surrounds at least part of the outer circumferential surface of the housing 14, by forming the thrust member 26 integrally with the first cylinder portion 20b. In this case, the gas-liquid interface of the lubricant 28 may also be brought into contact with the outer circumferential surface of the housing 14 and the inner circumferential surface of the cylindrical hanging member. That is, the gas-liquid interface of the lubricant is formed in the middle of a gap in which the inner circumferential surface of the cylindrical hanging member and the bearing outer circumferential surface, which is the outer circumferential surface of the bearing unit, face each other. The gap between the inner circumferential surface of the cylindrical hanging member and the bearing outer circumferential surface is provided so as to expand toward the lower side, and hence leak of the lubricant can be suppressed with capillarity while the lubricant 28 is being held. In this case, it is easy to adjust the outer diameter of the cylinder-shaped housing 14 and the inner circumferential diameter of the cylindrical hanging member, and thence the capillary seal portion TS can be easily formed such that the axial dimension thereof is large by easily and accurately making the gap thereof small. The capillary force can be made large by making the gap of the capillary seal portion TS small and the axial dimension thereof large, thereby allowing more lubricant 28 to be held. Further, the leak of the lubricant, occurring when an impact is applied, can be reduced because the capillary force becomes large.

As stated above, the capillary seal portion TS is designed such that the inner circumferential surface 26e, which is the outside inclined surface, is reduced in diameter going from the upper surface side toward the lower surface side. Accordingly, with the rotation of the rotating body R, centrifugal force acts on the lubricant 28 in the direction where the lubricant 28 is forced to move toward the inside of the area into which the lubricant 28 is injected, and hence leak of the lubricant 28 can be more surely prevented. Further, the communication channel I can be secured by the groove 14a formed along the axial direction on the inner circumferential surface of the housing 14. Because both sides of the first radial dynamic pressure generating portion RB1 and the second radial dynamic pressure generating portion RB2 are communicated by the communication channel I, a pressure balance in either of the radial dynamic bearings can be immediately restored even if the pressure balance breaks down, thereby allowing the whole pressure balance to be maintained well. Further, if a dynamic pressure balance in each of the first radial dynamic pressure generating portion RB1, the second radial dynamic pressure generating portion RB2, and the thrust dynamic pressure generating portion SB, breaks down due to a disturbance, such as application of external force to the shaft 22 or the rotating body R, the pressure is instantly averaged and a pressure balance can be maintained. As a result, a floating amount of the rotating body R relative to the fixed body S is stabilized, thereby allowing the disk drive device 100 with high reliability to be obtained.

There is the concern that the lubricant 28, which have been evaporated from the gas-liquid interface of the capillary seal portion TS may leak outside the hub 20. To prevent this from happening, in the present embodiment, the base plate 10 has the cylinder portion 10a, which is a protruding portion that protrudes from the surface of the base plate 10 near to the hub so as to surround the first cylinder portion 20b supporting the cylindrical hanging member or the thrust member 26. The axial length M1 of the facing surface that is part of the inner circumferential surface of the cylinder portion 10a, which faces the outer circumferential surface of the cylindrical hanging member (first cylinder portion 20b), is formed to be larger than the axial thickness M2 of the hub 20 along the axially extended line of the facing surface. That is, the cylinder portion 10a and the cylindrical hanging member (first cylinder portion 20b) form a so-called long labyrinth seal by their surfaces that face each other, thereby suppressing the lubricant 28, which have been evaporated from the gas-liquid interface, from leaking outside the hub 20.

As stated above, the cylindrical hanging member according to the present embodiment is formed to include the hanging portion 26a joined to the disk member 26b and the first cylinder portion 20b that protrudes from the lower surface of the hub 20. The hanging portion 26a is surrounded by the first cylinder portion 20b and is fixed thereto by adhesive. Although it is possible to form the hanging portion 26a and the first cylinder portion 20b with materials each having an expansion coefficient different from the other, there is sometimes the case where, when a predetermined test temperature shock (heat shock) is applied, the adhesive peels off due to the difference between the expansion coefficients. Accordingly, it is preferable to form the hanging portion 26a with a material similar to that of the first cylinder portion 20b or with a material having a coefficient of linear expansion approximate to that of the first cylinder portion 20b to maintain the joint even when a predetermined test temperature shock is applied. For example, when the first cylinder portion 20b is formed of a stainless steel material that is equivalent to SUS 430 having a coefficient of linear expansion of $10 \times 10^{-6}$, it is preferable to form the hanging portion 26a with a material having a coefficient of linear expansion similar to that of SUS 430. It has been confirmed by the inventors that, by adhering together the first cylinder portion 20b and the hanging portion 26a that are formed of such a combination of materials, the joint between the two can be maintained even when a test temperature shock of −20° C. to 80° C. is applied to the joint body. In the present embodiment, an example is described in which, in the thrust member 26, the hanging portion 26a and the disk member 26b are formed integrally with each other. In this case, it is preferable in terms of saving the work of processing and assembly.

In the present embodiment, the shaft 22 has a shaft hole 50 (non through-hole) having an open end on the end surface thereof near to the hub 20, as illustrated in FIGS. 2 and 3. Screw taps are formed on the inner circumferential surface of the shaft hole 50. Thereby, when the recording disk 200 (see FIG. 1) is mounted on the hub outward extension portion 20d (disk mounting surface), the recording disk can be pressed by a clamp member (not illustrated). At the time, the clamp member is fixed by screwing a screw into the shaft hole 50. If the axial length of such the shaft hole 50 is too small, there is sometimes the case where the joint strength between a clamp-fixing screw and the shaft 22 cannot be sufficiently obtained. If the joint strength is small, the joint of the clamp member comes loose, and thereby causing the recording disk 200 to come off. If the diameter of the shaft hole 50 is made large in order to enhance the joint strength, the thickness of the circumferential wall of the hole becomes small, thereby causing the fear that the outer circumferential surface of the shaft may be deformed when the taps are formed or the screw is fastened. Because the first and second radial dynamic pressure groves are formed on the outer circumferential surface of the shaft 22, the deformation thereof impairs a dynamic pressure generating function, thereby causing the fear that the function as a rotating device may be impaired. Accordingly, in the present embodiment, the closed end of the shaft hole 50 is formed at a position closer to the lower end of the second radial dynamic pressure generating groove of the second radial dynamic pressure generating portion RB2 than the upper end thereof in the axial direction, as illustrated in FIG. 3. By making the axial length of the shaft hole 50 to be large, the wall thickness of the shaft 22 can be secured by suppressing an increase in the diameter of the tap, while a decrease in the joint strength between the screw and the shaft 22 is being suppressed. That is, the deformation of the outer circumferential surface of the shaft 22 can be suppressed.

As stated above, in the present embodiment, the hub 20 has the second cylinder portion 20c (see FIG. 2), which is a disk engagement portion with which the inner circumferential portion of a fixation hole formed in the recording disk 200 (see FIG. 1) is to be engaged. The second cylinder portion 20c can be formed of, for example, a stainless steel material, such as SUS 430, by a cutting process. If the gap between the second cylinder portion 20c and the inner circumferential portion of the fixation hole of the recording disk 200 is large, there is the fear that the eccentricity of the recording disk 200 with respect to the rotational center thereof, occurring when the disk has been installed, may be increased by just that much. If the eccentricity of the recording disk 200 is large, the unbalance amount of the rotating body is increased to cause vibrations, thereby causing the possibility that an error ratio in reading/writing data may be increased. Accordingly, it is desirable that the gap between the second cylinder portion 20c and the inner circumferential portion of the fixation hole of the recording disk 200 is small. However, if the gap is made small, a possibility is increased in which, when the recording disk 200 is engaged with the second cylinder portion 20c, scrapings may be generated by scraping the surface of the second cylinder portion 20c. The scrapings form particles, which cause a failure in which read/write errors are increased.

The inventors have confirmed that such scrapings are likely to be generated when the difference between the concave and convex on a kerf surface of the second cylinder portion 20c, the kerf surface being created by a cutting process, is large.

Accordingly, a process, in which the difference between the concave and convex on the kerf surface is made to be small, may be performed on at least part of the second cylinder portion 20c, in the present embodiment. For example, a thin film layer for covering the surface of the second cylinder portion 20c can be provided. The thin film layer can be formed by adhering a metal material or a resin material. In the embodiment, nickel plating is performed on the second cylinder portion 20c. Nickel plating is preferred in terms that the recording disk 200 can be engaged smoothly and an amount of the scrapings is small, because the nickel plating has a high hardness. Alternatively, the concave and convex on the kerf surface may be embedded by adhering a resin material to the concave portion. This method is advantageous in terms of suppressing the formation of particles and easy work of this process.

Alternatively, at least part of the second cylinder portion 20c may be polished chemically or electrochemically to make the difference between the concave and convex on the kerf surface thereof to be small. Polishing using an acid, such as nitric acid, is preferred in terms of being able to collectively process many hubs. Electrolytic polishing is preferred in terms that individual variations in the degree of polishing are small.

The rotating body R of the disk drive device 100 comprises the annular magnet 24 adhered thereto, which is rotated integrally with the hub 20. The magnet 24 is formed by combining together magnetic powders including neodymium, iron, and boron as major components, with the use of a resin as a binder. In the comparative example, the magnet is formed by kneading an epoxy resin into magnetic powders, the magnetic powders having been selected with a sieve having meshes in which the number of the meshes per 25.4 mm (1 inch) is 80, and then by heating the kneaded material while pressing and compressing it in a predetermined mold. As a result of measuring the concentricity between the outer circumference and the inner circumference of the magnet thus manufactured, it has been known that the concentricity is 15 μm as an average of ten magnets, which is large and not so preferred as the concentricity. In a rotating body in which a magnet having large concentricity has been installed, an unbalance amount is increased and the recording disk and the recording head are vibrated during the rotation, thereby causing an error ratio in reading/writing data to be increased (deteriorated). Alternatively, it can be considered that the magnet is adhered to the inner circumference of the hub by arranging the magnet in a jig such that the center of the inner circumference of the magnet matches the rotational center of the rotating body; however, the eccentricity of the outer circumference with respect to the rotational center becomes large if concentricity is large. If the eccentricity of the outer circumference of the magnet is large, the gap with the inner circumference of the hub is biased in the circumferential direction. As a result, a possibility becomes high in which, when an impact is applied, peel-off may be caused due to a shortage of the adhesive interposed in the area where the gap is small.

Accordingly, in the present embodiment, the magnet is manufactured by using finer magnetic powders that have been selected with a sieve having meshes in which the number of the meshes per 25.4 mm (1 inch) is 120 and by the same processes as those in the comparative example. In this case, it has been confirmed that the concentricity between the outer circumference and the inner circumference is 6.8 μm as an average of ten magnets, which is approximately half that in the comparative example, and the bias of the adhesive interposed in the gap between the magnet 24 and the hub 20 can also be suppressed. As a result, the possibility that peel-off may be caused when an impact is applied is reduced, and an increase in the error ratio, occurring due to the unbalance of the rotating body, can also be suppressed. If the number of the meshes is too large, it takes a long time to select magnetic powders, which deteriorates the workability. The present inventors have confirmed that, when the number of the meshes per 25.4 mm (1 inch) is smaller than or equal to 160, the work can be preformed within the cycle time in the manufacturing process. Accordingly, it has been confirmed that the number of the meshes per 25.4 mm (1 inch) is preferably within a range of 120 to 160.

In addition, when a rotating device is configured to be small in the axial thickness, the stiffness of the bearing becomes low if the axial dimension of the shaft 22 is too small. In the present embodiment, the axial dimension of the shaft 22 is set to be within a range of 80% to 90% of the axial dimension between the upper end surface of the hub 20 and the lower end surface of the base plate 10. The present inventors have known from experiments that the aforementioned setting is advantageous in terms of suppressing a decrease in the stiffness of the bearing. In the embodiment, the axial dimension of the shaft 22 is set to 4.6 mm, which is equal to 85% of 5.4 mm that is the axial dimension between the upper end surface of the hub 20 and the lower end surface of the base plate 10. In addition, the axial dimension of the hub joint portion is 1.147 mm, which is made larger than 0.7 mm that is the axial dimension of the lubricant reservoir. The inventors have confirmed from experiments that such settings are advantageous in terms of being able to suppress the deformation of the hub joint portion of the hub 20, when an impact is applied.

The present embodiments have been described with respect to the case of being mainly used in a hard disk drive; however, the embodiments should not be limited thereto. For example, the embodiments may be used in an optical disk recording/reproducing device, such as, for example, a CD (Compact Disc) device, a DVD (Digital Versatile Disc) device, or the like.

The structures of the disk drive device according to the preferred embodiments have been described above. These embodiments are exemplarily described, and it is needless to say that these embodiments only exemplify the principles and applications of the invention. It can be readily understood by a person skilled in the art that various variations and arrangement alterations may be made within a range of not departing from the spirit of the invention specified in claims. by making various combinations of the aforementioned components, which are also encompassed in the scope of the present invention.

What is claimed is:

1. A rotating device comprising:
    a rotating body having a hub on which a recording disk is to be mounted and a shaft joined to a center hole of the hub;
    a fixed body having a base and a surrounding member that is fixed to the base and surrounds the shaft; and
    lubricant interposed between the rotating body and the fixed body,
    wherein the surrounding member has both a tubular sleeve for housing the shaft and a tubular housing for surrounding and fixing the sleeve,
    wherein a first radial dynamic pressure generating groove and a second radial dynamic pressure generating groove, which are used for generating radial dynamic pressure, are formed on at least one of an inner circumferential surface of the sleeve and an outer circumferential surface of the shaft, the second radial dynamic pressure generating groove being provided at a position spaced apart from the first radial dynamic pressure generating groove toward the base,
    wherein the sleeve has a flange portion protruding radially outward at an end portion of the sleeve near to the hub, and a sleeve concave portion, which is made by axially concaving at least part of an area corresponding to a wall thickness of the sleeve on an inner circumference side of the flange portion, is circumferentially provided,
    wherein a circumferential hub concave portion for housing at least part of the flange portion is circumferentially provided on a surface of the hub near to the sleeve, and a gap between the circumferential hub concave portion provided on the surface of the hub near to the sleeve and the at least part of the flange portion which is housed in the circumferential hub concave portion is filled with the lubricant, and
    wherein the hub has an enlarged-thickness portion that enters the sleeve concave portion and whose outer diameter is substantially equal to a diameter of a side surface of the sleeve.

2. The rotating device according to claim 1, wherein the sleeve is constructed to have a sleeve protruding port n that protrudes radially outward to be engaged with an upper surface of the housing near to the hub as the sleeve is inserted into a tubular surrounding portion formed in the housing, and
    wherein the sleeve protruding portion is formed at a position closer to an end of the first radial dynamic pressure generating groove near to the hub than to an end of the first radial dynamic pressure generating groove near to the base in an axial direction.

3. The rotating device according to claim wherein the rotating body includes a disk portion that is rotated with the rotating body between the housing and the flange portion, and
    wherein a thrust dynamic pressure generating groove for generating thrust dynamic pressure is formed on at least one of a surface of the disk portion and that of the flange portion, which face each other in an axial direction; or at least one of the surface of the disk portion and that of the housing, which lace each other in the axial direction.

4. The rotating device according to claim 1, wherein the rotating body includes a cylindrical hanging portion that surrounds at least part of an outer circumferential surface of the housing, and
    wherein a gas-liquid interface where the lubricant is brought into contact with a gas is formed between the outer circumferential surface of the housing and an inner circumferential surface of the cylindrical hanging portion.

5. The rotating device according to claim 4, wherein the base has a protruding portion that protrudes from a surface of the base near to the hub so as to surround the cylindrical hanging portion, and
    wherein an axial length of a facing surface that is part of an inner circumferential surface of the protruding portion, which faces an outer circumferential surface of the cylindrical hanging portion in a radial direction, is larger than an axial thickness of the hub along an axially extended line of the facing surface.

6. The rotating device according to claim 1, wherein the shaft has a non through-hole extending from an end surface of the shaft near to the hub toward the base, and the non through-hole is formed to a position beyond an end of the second radial dynamic pressure generating groove near to the hub in an axial direction.

7. The rotating device according to claim 1, wherein the hub has a disk engagement portion that is engaged with an inner circumferential portion of a center hole formed in the recording disk, and
   wherein the disk engagement portion is subjected to a surface process in which a difference between a concave and a convex on a kerf surface created by a cutting process is made smaller than immediately after said cutting process.

8. The rotating device according to claim 1, wherein an upper surface of the flange portion in an axial direction axially facing the hub is formed at an end portion of the flange portion near to the hub, and an inner circumferential diameter of the upper surface of the flange portion in the axial direction is formed to be larger than a diameter of a side surface of the sleeve, the side surface being in contact with an inner circumferential surface of the housing.

9. The rotating device according to claim 1, wherein a surface of the enlarged-thickness portion toward the base is seated in a shaft step portion provided on the outer circumferential surface of the shaft in an axial range of the sleeve concave portion.

10. The rotating device according to claim 9, wherein an annular concave portion engaged with the shaft step portion is provided on the surface of the enlarged-thickness portion toward the base.

11. A rotating device comprising:
   a rotating body having a hub on which a recording disk is to be mounted and a shaft joined to a center hole of the hub;
   a fixed body having a base and a surrounding member that is fixed to the base and surrounds the shaft; and
   lubricant interposed between the rotating body and the fixed body,
   wherein the surrounding member has a tubular sleeve for housing the shaft,
   wherein a radial dynamic pressure generating portion for generating radial dynamic pressure is provided on at least one of an inner circumferential surface of the sleeve and an outer circumferential surface of the shaft,
   wherein the sleeve has a flange portion protruding radially outward at an end portion of the sleeve near to the hub, and a sleeve concave portion, which is made by axially concaving at least part of an area corresponding to a wall thickness of the sleeve on an inner circumference side of the flange portion, is circumferentially provided,
   wherein a circumferential hub concave portion for housing at least part of the flange portion is circumferentially provided on a surface of the hub near to the sleeve, and a gap between the circumferential hub concave portion provided on the surface of the hub near to the sleeve and the at least part of the flange portion which is housed in the circumferential hub concave portion is filled with the lubricant, and
   wherein the hub has an enlarged-thickness portion that enters the sleeve concave portion and whose outer diameter is substantially equal to a diameter of a side surface of the sleeve.

12. The rotating device according to claim 11, wherein the radial dynamic pressure generating portion includes a first radial dynamic pressure generating groove and a second radial dynamic pressure generating groove provided at a position spaced apart from the first radial dynamic pressure generating groove toward the base, and
   wherein the shaft has a non through-hole extending from an end surface of the shaft near to the hub toward the base, and the non through-hole is formed to a position beyond an end of the second radial dynamic pressure generating groove near to the hub in an axial direction.

13. The rotating device according to claim 11, wherein the rotating body includes a thrust member having both a disk portion that is rotated with the rotating body in an area near to the base with respect to the flange portion and a cylindrical hanging portion that surrounds at east part of an outer circumferential surface of the surrounding member, and
   wherein a gas-liquid interface where the lubricant is brought into contact with a gas is formed between the outer circumferential surface of the surrounding member and an inner circumferential surface of the cylindrical hanging portion.

14. The rotating device according to claim 11, wherein a surface of the enlarged-thickness portion toward the base is seated in a shaft step portion provided on the outer circumferential surface of the shaft in an axial range of the sleeve concave portion.

15. A rotating device comprising:
   a rotating body having a hub on which a recording disk is to be mounted and a shaft joined to a center hole of the hub;
   a fixed body having a base and a surrounding member that is fixed to the base and surrounds the shaft; and
   lubricant interposed between the rotating body and the fixed body,
   wherein the surrounding member has a tubular sleeve for housing the shaft,
   wherein the sleeve has a flange portion protruding radially outward at an end portion of the sleeve near to the hub, and a sleeve concave portion, which is made by axially concaving at least part of an area corresponding to a wall thickness of the sleeve on an inner circumference side of the flange portion, is circumferentially provided,
   wherein a circumferential hub concave portion for housing at least part of the flange portion is circumferentially provided on a surface of the hub near to the sleeve, and a gap between the circumferential hub concave portion provided on the surface of the hub near to the sleeve and the at least part of the flange portion which is housed in the circumferential hub concave portion is filled with the lubricant, and
   wherein the hub has an enlarged-thickness portion that enters the sleeve concave portion and whose outer diameter is substantially equal to a diameter of a side surface of the sleeve.

16. The rotating device according to claim 15, wherein a first radial dynamic pressure generating groove and a second radial dynamic pressure generating groove, which are used for generating radial dynamic pressure, are formed on at least one of an inner circumferential surface of the sleeve and an outer circumferential surface of the shaft, the second radial dynamic pressure generating groove being provided at a position spaced apart from the first radial dynamic pressure generating groove toward the base, and
   wherein the shaft has a non through-hole extending from an end surface of the shaft near to the hub toward the base, and the non through-hole is formed to a position beyond an end of the second radial dynamic pressure generating groove near to the hub in an axial direction.

17. The rotating device according to claim 15, wherein the rotating body includes a thrust member having both a disk portion that is rotated with the rotating body in an area near to the base with respect to the flange portion and a cylindrical hanging portion that surrounds at least part of an outer circumferential surface of the surrounding member, and wherein a gas-liquid interface where the lubricant is brought into contact with a gas is formed between the outer circumferential surface of the surrounding member and an inner circumferential surface of the cylindrical hanging portion.

18. The rotating device according to claim 15, wherein a surface of the enlarged-thickness portion toward the base is seated in a shaft step portion provided on the outer circumferential surface of the shaft in an axial range of the sleeve concave portion.

* * * * *